Sept. 29, 1953     W. A. SUTHERLAND     2,653,401
IDENTIFICATION TAG
Filed Aug. 16, 1950     2 Sheets-Sheet 2
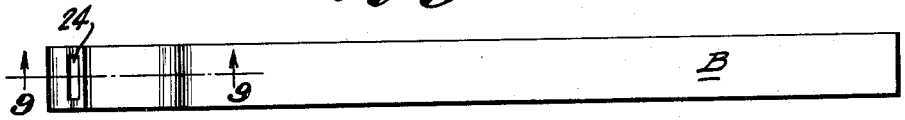
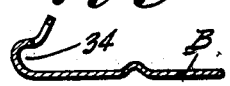  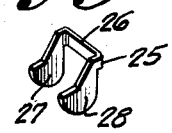
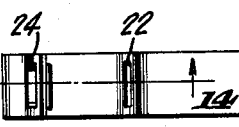
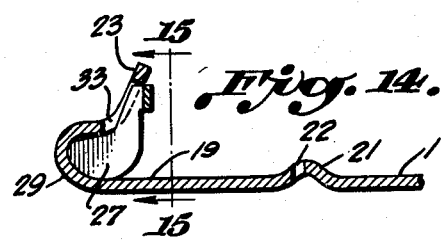 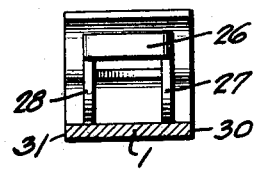
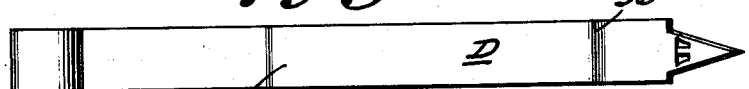
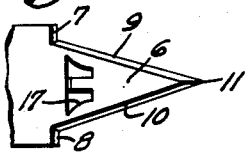 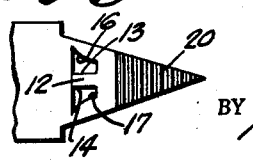
INVENTOR
WILLIAM ALFRED SUTHERLAND
BY
ATTORNEY Patented Sept. 29, 1953

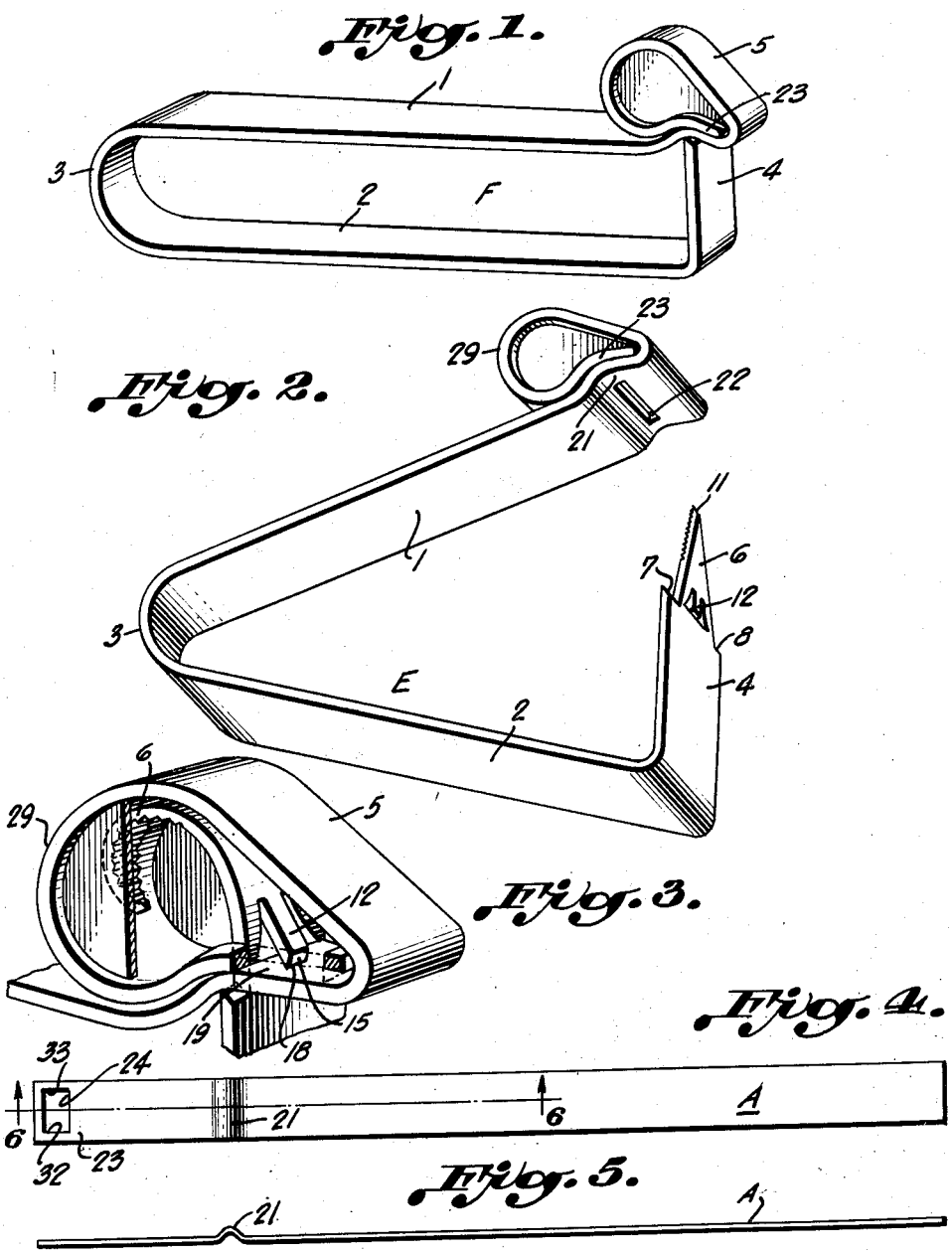

2,653,401

UNITED STATES PATENT OFFICE 2,653,401

IDENTIFICATION TAG

William Alfred Sutherland, Essex Junction, Vt.

Application August 16, 1950, Serial No. 179,769

12 Claims. (Cl. 40—3)

1

This invention relating as indicated to an identification tag is more particularly directed to a tamper-proof tag adapted to be attached to the ear of an animal and when once attached being incapable of removal except by breakage of the tag. While the tag is admirably adapted for cattle identifying purposes it is by no means restricted to this application since it may be used in connection with any material that is capable of being punctured or cut.

It is an object of the invention to provide a tag formed of two cooperating parts, one of which is inserted into the other, the parts being so proportioned and arranged that in one easy quick motion of an attaching tool such as a pair of pliers, the tag can be inserted into and through the ear of an animal, for example, one part constituting an inserting portion and being easily and quickly received and locked in the other part.

Another object of the invention is to provide a tag made of a single piece of metal, this piece of metal having sharp knife edges on one of its ends which is preferably pointed and also having an integral closed locking chamber on the other end.

It is another object of the invention to provide a tag formed of two parts, one of which has a pointed end which is received in a chamber formed on the other part, this chamber being sealed by closure means assembled with the same and requiring no separate securing step.

A specific object of the invention is to provide a tag with the above-described closure means which, if an attempt is made to bend the closure so as to open the chamber, the same will break, thus affording visible means of an unauthorized attempt to tamper with the tag.

It is a still further object of the invention to provide a tag with parts thereof arranged and formed in such manner that the pointed end on one portion will break off if an attempt is made to withdraw said pointed end from the sealed chamber, thus disclosing an unauthorized attempt to open the tag.

It is another object of the invention to provide a tag with a sealed chamber that is adapted to receive a pointed end and one which will disclose tampering by breakage of the sealed chamber from the remainder of the tag.

A still further object of the invention is to provide a pointed end on one of the afore-described parts which when inserted into a sealed locking chamber will easily curve into an arc when said end slides along an arcuate surface due to the provision of transverse serrations.

Another object is to provide a tag having a locking chamber which receives a pointed end, the pointed end being formed with a locking lug that bends outwardly when the pointed end is

2 bent, thus securing the parts in interlocked relationship.

A more detailed object of the invention is to provide a tag having entering or cutting edges which will cut (instead of tearing) a clean, neat slot in an animal's ear which is the full width of the tag itself, thus eliminating stretching, pulling, or tearing of the ear tissue.

Another detailed object of the invention is to form a tag which will not close beyond a predetermined locking position so that the two major portions thereof extend in spaced relationship so as to avoid any possibility of pinching or bruising the ear tissue or other material to which the tag is attached.

Another detailed object of the invention is to provide closure members which are spaced inwardly from the locking chamber walls, thus rendering access to the closure members difficult if not impossible in order to avoid opening of the closure members and tampering with the interlocked parts.

Other objects and advantages of the invention will become apparent as the description proceeds, reference being made to the accompanying drawings forming a part of the present description wherein:

Fig. 1 is a perspective view of the tag in locked position.

Fig. 2 is a perspective view of the completed tag in open or unlocked position.

Fig. 3 is a perspective view of the upper part or locking chamber with parts broken away.

Fig. 4 is a plan view of a blank after the first step in the process of manufacture.

Fig. 5 is a side elevation of Fig. 4.

Fig. 6 is a partial section of line 6—6 of Fig. 4.

Fig. 7 is a plan view of a blank after the second step in the process of forming the same.

Fig. 8 is a side elevation of Fig. 7.

Fig. 9 is a partial section on line 9—9 of Fig. 7.

Fig. 10 is a plan view of a blank from which the closure member is formed.

Fig. 11 is a perspective view of the completed closure member.

Fig. 12 is a plan view taken from above of a blank after the third step in the process of forming the same.

Fig. 13 is a side elevation of Fig. 12.

Fig. 14 is a partial section on line 14—14 of Fig. 12.

Fig. 15 is a vertical section on line 15—15 of Fig. 14.

Fig. 16 is a plan view taken from above of the blank after the fourth step in the operation and immediately before the final bending operation.

Fig. 17 is a side elevation of Fig. 16.

Fig. 18 is an enlarged detail of the pointed end taken from above as viewed in Fig. 16, and Fig. 19 is a view similar to Fig. 18 taken from below.

Referring now to the drawings, and more particularly to Fig. 1, it will be seen that my improved identification tag comprises parts which for convenience of description may be termed an upper portion 1 and a lower portion 2, these parts extending in spaced parallel relationship. It will, of course, be understood that the spacing depends upon the thickness of the material which is desired to be tagged and that the spacing shown is not the actual spacing in a tag used, for example, to identify cattle.

The parts 1 and 2 are connected by a bend 3, this bend permitting the terminal portions of the parts as shown in Fig. 2 to be drawn together by a suitable tool which forces the entering end 4 into the chamber portion 5. It will of course be seen that the entering end 4 is formed by bending the part 2 at right angles.

Referring now more particularly to the entering end 4 it will be observed that this part of the tag has a width which is the same as the remainder of the tag except at its terminal portion. This terminal portion is in the form of a triangle 6, the base of which is of less width than the width of the portion 4, thus providing the transverse cutting edges 7 and 8. These transverse cutting edges join the angular cutting edges 9 and 10 which latter edges meet at the point 11. (See Fig. 18.) Thus it will be seen that the penetrating or entering portion of the tag has a long, relatively narrow triangular part provided with cutting edges and that these cutting edges adjoin transverse cutting edges so that the pointed end readily penetrates any material to which the tag is to be attached for cutting the same the full width of the tag or at least the full width of the part of the tag which extends through such material.

The pointed end 6 is provided with a locking lug 12, this locking lug being formed with parallel longitudinal edges 13 and 14 and an outer free end 15. Attention is directed to the fact that the parallel edges 13 and 14 of the locking lug are spaced from the edges 16 and 17, thus permitting the locking lug to bend without any difficulty whatsoever. It will also be noted that the free end 15 is bevelled which further assists in the bending of the lug 12 and also insures a snug locking engagement since the transverse edge 18 rides along the inner surface 19 of the locking chamber 5; that is, the edge 18 as the pointed end is curved by contact with the interior arcuate wall of the locking chamber, slides over the surface 19 but remains in engagement with the same.

In order to assure bending of the pointed end 6, this end is provided with a serrated portion 20, the serrations being on the underside of the pointed end so that as this end is forced upwardly as viewed in Fig. 3 and into contact with the interior surface of the locked chamber 5, it curls outwardly and downwardly. It is important to note in this connection that the arc formed by curving of the pointed end 6 is opened toward the locking lug 12, or in other words, the locking lug is bent in one direction with respect to the base of the triangular pointed end and the serrated tip 11 is bent in an opposite direction. Thus it will be seen that the pointed end is effectively locked in position since portions thereof extend in opposite directions within the slot 22.

Referring again to the locking lug 12 and its spaced parallel edges, there is another reason for spacing such edges from the remainder of the pointed end and that is to provide a weakened line along which the pointed end will break if an attempt be made to pull the part 2 away from the part 1. Thus it will be impossible to remove the tag and use it over again.

The upper or receiving end 1 of the tag is provided with an upwardly extending hump or curved portion 21 and a slot 22 is formed in this hump adapted to receive the pointed end 6. The portions of the tag adjacent the slot are curved due to the formation of the hump thus providing a guide for the tip 11 in case of slight misalignment when the tag is being attached. The curved or arcuate portions of the part 1 adjacent the slot 22 cause the tip 11 to slide into the slot 22 if such tip is not initially received in the slot. This hump has a further function in that it receives the cutting edges 7 and 8, which are removed or spaced from the material being tagged. Thus these cutting edges pass entirely through the ear of an animal, in one use, and being above or projecting out of the material are received in a pocket or depression formed by the hump 21.

The sealed locking chamber 5 is formed by reversely bending the end of the upper part 1 so that the terminal portion 23 overlies the surface 19 shown in Figs. 1, 2, and 3. The terminal portion 23 is provided with an aperture 24 somewhat similar to the slot 22 but of larger dimensions. This slot is adapted to receive the closure member 25 and also to permit the pointed end 6 to pass through the same, and in addition is larger than slot 22 to permit the free end of lug 12 to bend and slidingly contact surface 19 in the manner heretofore described.

The closure member is shown in its initial form in Fig. 10 and comprises a cross piece 26 which connects two parallel ears 27 and 28. The ears extend between the terminal portion 23 and the curved portion 29 of the locking chamber. It will be obvious by referring to Fig. 15 that the ears 27 and 28 are spaced inwardly from the longitudinal edges 30 and 31 of the upper part 1. This in effect prohibits access to the ears which in turn prevents opening the ears in order to reach the interior of the locking chamber to attempt separation of the parts 1 and 2.

The aperture generally indicated at 24 is bound by two longitudinally extending edges 32 and 33 and these edges abut the ears 27 and 28 respectively to thus prevent transverse movement of the closure member whereas longitudinal movement is precluded by the bending operation wherein the terminal 23 is bent down upon the surface 19. It is pointed out that the closures on both sides of the sealed locking chamber are assembled with the structure without the aid of extraneous securing means, such as welding or the like. This renders the cost of production quite low and at the same time results in a tamper-proof construction since the closure member is interlocked in place and positively prevented from moving in either direction transversely of the tag as well as longitudinally.

In order to form the tag of my invention it is merely necessary to first stamp or otherwise provide a flat longitudinal rectangular blank. By preferring to Fig. 4 the first step in the process of manufacture will be seen to reside in punching out the aperture 24 and stamping or otherwise forming the hump 21. In this manner the blank A is made.

In the second step the blank B is formed by cutting the slot 22 and bending the portion 23 to form the cross section shown in Fig. 8.

In the next step, the blank shown in Fig. 10 is formed and this in turn is bent so that the ears 27 and 28 extend in parallelism and in planes at right angles to the plane of the cross piece 26.

The next step consists of inserting the closure member 25 into the recess 24 with the ears 27 and 28 in contact with the edges 32 and 33 of the aperture 24. This results in the blank C as shown in Figs. 12 to 15 inclusive.

The terminal portion 23 is now bent into its final position as shown in Fig. 17 forming the blank D. This bending operation consists in bending the terminal 23 down upon the surface 19 and then over again so that the aperture 24 overlies the slot 22.

The blank D which was previously provided with transverse bends 35 and 36 is now bent to provide the finished tag E as shown in Fig. 2, these bends being along the lines 35 to 36.

In order to use the tag it is merely necessary to place the same with the parts 1 and 2 above and below the material which is to be tagged and then press such parts toward each other. This causes the tip 11 to enter the slot 22 and pass through the aperture 24 and then due to the serrations 20 to very easily curve to the left as viewed in Fig. 3 around the interior surface of the locking chamber 5. After the pointed end 6 has entered into the locking chamber to a predetermined extent, further entry is prevented by the small transverse edges 7 and 8 but while the pointed end 6 is being bent the locking lug 12 is also being bent and this bending movement is in an opposite direction; that is, opposite to the arc formed by the pointed end 6. As the pointed end 6 bends, the free end of lug 12 bends to the right as viewed in Fig. 3 and the edge 18 of the lug 12 slides along the surface 19 in pressure contact therewith so that when the parts are in final position as shown in Fig. 3 they are snugly engaged and there is no looseness.

From the foregoing description it will be seen that I have provided a tag which may be used for identification purposes and one which is of tamper-proof construction. Furthermore, it will be noted that one end of the tag is locked within the other end effectively and securely and that it is impossible to pry the major portion of the tag apart without breaking some part of the tag. Also, the closure member of my novel construction prevents entry to the locking chamber with any tool or device for tampering with a lock. In addition, the pointed end or entering end of the tag is formed with sharp cutting edges, these edges extending the full width of the tag so as to impart a clean incision, thus preventing tearing, pulling, or stretching of the material to which the tag is attached.

This application is a continuation-in-part of my application, Serial No. 109,150, entitled "Tamperproof Identification Tag," filed August 8, 1949.

I therefore particularly point out and distinctly claim as my invention:

1. An identification tag comprising two connected parts, a slot in one part and a pointed end on the other part, means to prevent withdrawal of said pointed end when the same is inserted into said slot and then bent, said pointed end being in the form of a triangle having a base integral with said other part, the width of said base being less than the width of said other part to thereby provide shoulders on opposite sides of said triangle and aligned with the base thereof which act as stop means preventing inward movement of said other part, said means to prevent withdrawal including a lug bendable with respect to and initially lying in the plane of, said pointed end and lying at an angle with respect to said pointed end, when said pointed end is inserted in said slot and bent.

2. An identification tag comprising two connected parts, a slot in one part and a pointed end on the other part, means to prevent withdrawal of said pointed end when the same is inserted into said slot and then bent, said pointed end being in the form of a triangle having a base integral with said other part, the width of said base being less than the width of said other part to thereby provide shoulders on opposite sides of said triangle and aligned with the base thereof which act as stop means preventing inward movement of said other part, said means to prevent withdrawal including a lug bendable with respect to and initially lying in the plane of, said pointed end, said lug having a base integral with said tag and a free end, said base lying between said end and the base of said triangle and said free end being adjacent the base of said triangle.

3. An identification tag comprising two connected parts, a slot in one part and a pointed end on the other part, means to prevent withdrawal of said pointed end when the same is inserted into said slot and then bent, said pointed end being in the form of a triangle having a base integral with said other part, the width of said base being less than the width of said other part to thereby provide shoulders on opposite sides of said triangle and aligned with the base thereof which act as stop means preventing inward movement of said other part, said triangle having edges that meet to form a point, said edges being bevelled so as to produce cutting edges.

4. An identification tag comprising two connected parts, a slot in one part and a pointed end on the other part, means to prevent withdrawal of said pointed end when the same is inserted into said slot and then bent, said pointed end being in the form of a triangle having a base integral with said other part, the width of said base being less than the width of said other part to thereby provide shoulders on opposite sides of said triangle and aligned with the base thereof which act as stop means preventing inward movement of said other part, said shoulders forming transverse edges, said transverse edges being bevelled to produce cutting edges, said triangle having edges that meet to form a point, said edges being bevelled so as to produce cutting edges.

5. An identification tag comprising two connected parts, a slot in one part and a pointed end on the other part, means to prevent withdrawal of said pointed end when the same is inserted into said slot and then bent, said pointed end being in the form of a triangle having a base integral with said other part, the width of said base being less than the width of said other part to thereby provide shoulders on opposite sides of said triangle and aligned with the base thereof which act as stop means preventing inward movement of said other part, said means to prevent withdrawal including a lug initially lying in the plane of said pointed end, said lug having a base integral with said tag and a free end, said lug base lying between said free end of the lug and the pointed end of said triangle and said free end being adjacent the base of said triangle, said lug having sides extending to said free end, said free end being bevelled to provide pressure contact between it and the slotted part.

6. An identification tag comprising two connected parts, a slot in one part and a pointed end on the other part, means to prevent withdrawal of said pointed end when the same is inserted into said slot and then bent, said pointed end being in the form of a triangle having a base integral with said other part, the width of said base being less than the width of said other part to thereby provide shoulders on opposite sides of said triangle and aligned with the base thereof which act as stop means preventing inward movement of said other part, said means to prevent withdrawal including a lug bendable with respect to and initially lying in the plane of said pointed end, said lug having a base integral with said tag and a free end, said base lying between said free end and the base of said triangle and said free end being adjacent the base of said triangle, said lug having sides extending to said free end, said free end being bevelled to provide pressure contact between it and the slotted part, said sides being parallel and spaced from adjacent edges in said pointed end to cause the lug to bend away from said pointed end when the same is bent.

7. An identification tag comprising two connected parts, a slot in one part and a pointed end on the other part, means to prevent withdrawal of said pointed end when the same is inserted into said slot and then bent, said means including a lug in said pointed end that bends in one direction when said pointed end is curved in an opposite direction, such slotted part being reversely bent to form an open chamber over the slot and means to close said chamber, such means comprising parallel portions connected by a cross piece, said parallel portions being held in place by the reversely bent portion of said slotted part, said pointed end comprising a triangle having its base integrally connected to said other part, the width of said base being less than the width of said other part to thereby provide shoulders on opposite sides of said triangle and aligned with the base thereof which act as stop means preventing inward movement of said other part.

8. An identification tag comprising two connected parts, a slot in one part and a pointed end on the other part, means to prevent withdrawal of said pointed end when the same is inserted into said slot and then bent, said means including a lug in said pointed end that bends in one direction when said pointed end is curved in an opposite direction, such slotted part being reversely bent to form an open chamber over the slot and means to close said chamber, such means comprising parallel portions connected by a cross piece, said cross piece being flat and lying in a plane at right angles to the planes of said parallel portions, said pointed end comprising a triangle having its base integrally connected to said other part, the width of said base being less than the width of said other part to thereby provide shoulders on opposite sides of said triangle and aligned with the base thereof which act as stop means preventing inward movement of said other part.

9. An identification tag comprising a receiving part and an entering part with a pointed end, said parts being adapted to be interlocked, said receiving part having an end portion that is reversely bent and then forwardly bent to form a chamber with the terminal part of said end portion overlying a portion of said receiving part, said terminal part having an aperture therein juxtaposed with a slot in said portion, and said pointed end having a portion passing through said slot and aperture when said parts are interlocked, the last named portion being bent into an arc, said last named portion having a lug that is bent outwardly and away from said arc, said pointed end comprising a triangle having its base integrally connected to said entering part with the width of said base being less than the width of said entering part, to thereby provide shoulders on opposite sides of said triangle and aligned with the base thereof which act as stop means preventing inward movement of said other part.

10. An identification tag comprising a receiving part and an entering part with a pointed end, said parts being adapted to be interlocked, said receiving part having an end portion that is reversely bent and then forwardly bent to form a chamber with the terminal part of said end portion overlying a portion of said receiving part, said terminal part having an aperture therein juxtaposed with a slot in said portion, and said pointed end having a portion passing through said slot and aperture when said parts are interlocked, the last named portion being bent into an arc, said last named portion having a lug that is bent outwardly and away from said arc, portions being removed adjacent said lug to present a weakened line along which breakage occurs when said pointed end is moved away from said receiving part, said pointed end comprising a triangle having its base integrally connected to said entering part with the width of said base being less than the width of said entering part, to thereby provide shoulders on opposite sides of said triangle and aligned with the base thereof which act as stop means preventing inward movement of said other part.

11. An identification tag comprising two connected parts, a slot in one part and a pointed end on the other part, said pointed end having a locking lug that initially lies in the plane of said pointed end so as to permit ready insertion of said pointed end into said slot, means in said tag to cause said pointed end to curve in one direction when the same is forced into said slot and to cause said lug to bend in an opposite direction, said pointed end comprising a triangle having its base integrally connected to said other part, the width of said base being less than the width of said other part to thereby provide shoulders on opposite sides of said triangle and aligned with the base thereof which act as stop means preventing inward movement of said other part.

12. An identification tag as set forth in claim 11 wherein said pointed end is provided with serrations to facilitate said curving.

W. ALFRED SUTHERLAND.

References Cited in the file of this patent

UNITED STATES PATENTS

| Number | Name | Date |
|---|---|---|
| 1,902,531 | Timson | Mar. 21, 1933 |
| 2,087,295 | Pannier | July 20, 1937 |
| 2,149,411 | Ashton | Mar. 7, 1939 |
| 2,309,030 | Wittlinger | Jan. 19, 1943 |
| 2,554,949 | Mackey | May 29, 1951 |
| 2,590,883 | Nierhaus | Apr. 1, 1952 |